United States Patent
Heel et al.

(10) Patent No.: US 7,165,519 B2
(45) Date of Patent: Jan. 23, 2007

(54) METHOD FOR CONTROLLING AN INLET VALVE OF AN INTERNAL COMBUSTION ENGINE

(75) Inventors: Bernhard Heel, Lauterbourg (FR); Bernhard Jutz, Burgstetten (DE); Oliver Marx, Stuttgart (DE); Rüdiger Pfaff, Stuttgart (DE); Timo Schmidt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/208,438

(22) Filed: Aug. 19, 2005

(65) Prior Publication Data

US 2006/0185646 A1 Aug. 24, 2006

Related U.S. Application Data

(63) Continuation-in-part of application No. PCT/EP04/00501, filed on Jan. 22, 2004.

(30) Foreign Application Priority Data

Feb. 20, 2003 (DE) .................. 103 07 167

(51) Int. Cl.
*F01L 1/34* (2006.01)
*F01L 1/344* (2006.01)
(52) U.S. Cl. .................. 123/90.15; 123/90.32
(58) Field of Classification Search ............ 123/90.15, 123/90.16, 90.17, 90.18, 90.11, 90.32, 301, 123/306
See application file for complete search history.

(56) References Cited

U.S. PATENT DOCUMENTS

| 4,523,560 | A | | 6/1985 | Motosugi et al. | |
| 4,552,112 | A | * | 11/1985 | Nagao et al. | 123/432 |
| 4,647,312 | A | | 3/1987 | Sampath | |
| 4,651,684 | A | * | 3/1987 | Masuda et al. | 123/90.16 |
| 5,230,320 | A | | 7/1993 | Hitomi et al. | |
| 6,386,156 | B1 | * | 5/2002 | Stockhausen et al. | 123/90.15 |
| 2003/0079702 | A1 | * | 5/2003 | Phlips | 123/90.15 |
| 2004/0250780 | A1 | * | 12/2004 | Turquis | 123/90.11 |

FOREIGN PATENT DOCUMENTS

| DE | 36 21 080 | 5/1990 |
| DE | 39 40 752 | 6/1991 |
| DE | 43 41 945 | 2/1995 |
| DE | 196 06 054 | 7/1998 |
| DE | 101 17 541 | 10/2001 |
| DE | 101 43 147 | 4/2002 |
| DE | 101 57 659 | 7/2002 |
| EP | 0 490 464 | 6/1992 |
| WO | WO 97/07324 | 2/1997 |

* cited by examiner

*Primary Examiner*—Mahmoud Gimie
(74) *Attorney, Agent, or Firm*—Klaus J. Bach

(57) ABSTRACT

In a method for controlling an inlet valve of an internal combustion engine having at least one cylinder with at least a first inlet valve and a second inlet valve, wherein the closing time of the first inlet valve is adjustable and the first inlet valve is so controlled that, at a first engine speed, the first inlet valve is closed before the closing of the second inlet valve and, at a second engine speed which is higher than the first engine speed, the first inlet valve is closed after the closing time of the second inlet valve.

7 Claims, 2 Drawing Sheets

METHOD FOR CONTROLLING AN INLET VALVE OF AN INTERNAL COMBUSTION ENGINE

This is a Continuation-In-Part Application of International Application PCT/EP2004/000501 filed Jan. 22, 2004 and claiming the priority of German application 103 07 167.9 filed Feb. 20, 2003.

BACKGROUND OF THE INVENTION

The invention relates to a method of controlling an internal combustion engine with a cylinder having at least two inlet valves, the timing of at least one of which is adjustable.

Internal combustion engines are designed to be operated over a wide rotational speed range. In order to obtain a high torque accompanied at the same time by an acceptable degree of efficiency and low exhaust gas emission values over the wide rotational speed range it is necessary to make compromises in the design of the valve geometry and the valve control system, the gas inlet system and the fuel supply. Internal combustion engines are usually operated more often in the lower rotational speed range than in the higher rotational speed range. For this reason it is particularly appropriate for a low emission of pollutants to configure an internal combustion engine in such a way that it permits efficient combustion in particular in a low rotational speed range. Diesel engines which are usually equipped with a non-adjustable valve drive because of the internal geometry of their cylinders, are a problem in terms of the emission of pollutants. The valve lifting curve is usually configured to a considerable degree according to criteria of achievable power and torque. In order to comply with exhaust gas legislation, the injection is varied and attempts are made to convert the pollutants using exhaust gas treatment techniques.

It is known that a good degree of turbulence of the combustion air flowing into the interior of the cylinders, referred to as swirl, improves the mixing of the injected fuel with the combustion air and thus results in good combustion with a high power yield and relatively low emission of pollutants. In order to generate a swirl, DE 196 06 054C2 proposes that two inlet valves per cylinder be operated in one or two opening modes with different stroke action curves. The different valve movements of the two inlet valves generate selective turbulence in the form of swirls, allowing the combustion process to be influenced and improved. DE 43 419 45 A1 also mentions, but with respect to a spark ignition engine, that the inflow conditions can be improved by selective control of the valve stroke.

It is the object of the invention to provide a method by which both, a particularly efficient combustion and a high torque can be achieved in the operation of an internal combustion engine.

SUMMARY OF THE INVENTION

In a method for controlling an inlet valve of an internal combustion engine having at least one cylinder with at least a first inlet valve and a second inlet valve, wherein the closing time of the first inlet valve is adjustable and the first inlet valve is so controlled that, at a first engine speed, the first inlet valve is closed before the closing of the second inlet valve and, at a second engine speed, which is higher than the first engine speed, the first inlet valve is closed after the closing time of the second inlet valve.

Tests have shown that a good swirl of the combustion air flowing into the interior of the cylinder can be generated satisfactorily with different stroke sequences of the two inlet valves. However, swirl can be generated just as well or better with a satisfactory degree of filling of the cylinder in the low rotational speed range of the internal combustion engine if one of the inlet valves closes earlier than the other inlet valve. It has been found that the combustion air flowing into the interior of the cylinder only through one inlet valve at the end of an inlet process generates particularly effective swirl which cause good mixing of the fuel with the air. The invention thus permits particularly effective rotational-speed-dependent swirl control by means of the valve control system. As a result, the basic swirl provided by the inlet duct geometry can be smaller. As a result of the early closing time of the first inlet valve, that is to say a chronologically narrow valve lifting curve, a high degree of swirl with a large inlet air flow volume is obtained. In addition, filling losses are avoided. Furthermore, during operation with a narrow valve lifting curve of the first inlet valve at low engine speeds improvements in the emission of pollutants, in particular with respect to pollutant particles, are obtained. In addition, the effective average pressure at low rotational speeds can be increased in accordance with an increased air supply. As a result, a torque gain is obtained at a low rotational speed and acceleration weaknesses can be overcome.

At relatively high rotational speeds, the closing time of the first valve is moved to a later time from the swirl-generating early time. As a result, the swirl of the in-flowing combustion air generated by the charge air movement is lower at high rotational speeds. The longer valve opening time and the reduction in the swirl result in a reduced charge exchange energy consumption. Overall, the effective average pressure can therefore be increased at low rotational speeds by an increased swirl. At higher engine speeds, the air supply to the cylinders is increased and energy losses are reduced by a reduced turbulence. The increased degree of filling of the cylinder leads to a gain in power in the high rotational speed range, and in particular at the nominal rotational speed of the engine, and to reduced fuel consumption, while in the lower speed range a smooth power output with low emissions is obtained.

In order to further increase the swirl in the lower rotational speed range, the opening time of the first inlet valve can be adjusted toward late opening. The first inlet valve thus opens without valve overlap with the outlet valve. As a result, a partial vacuum can be produced in the cylinder, which causes high gas inflow speeds when the first valve opens. In addition to the high degree of swirl which is generated in this way. This measure allows the geometric compression ratio to be lowered since at engine startup there is no valve overlap so that the full compression stroke is available for the compression of the combustion gases. The degree of supercharging can consequently be increased as the geometric compression ratio is reduced. The charge exchange losses are expediently minimized by making the ramp as steep as possible, permitting a large adjustment range. Particularly simple control is achieved with an opening time with low variability, or no variability.

The closing time of the first inlet valve at the first engine speed expediently is at least 20°, measured at the crank angle, in particular at least 40°, earlier than the closing time of the first inlet valve at the second engine speed. As a result, particularly effective generation of swirl in the low rotational speed range and particularly good power in the high rotational speed range are obtained. A further improvement in terms of emission of pollutants and/or power can be obtained if the closing time of the first inlet valve at the first engine speed lies at least 20° before the closing time of the second inlet valve, and at least 20° after the closing time of the second inlet valve at the second engine speed.

A particularly simple, cost-effective design which also saves installation space is obtained by keeping the closing time of the second inlet valve constant over the entire rotational speed range. The second inlet valve does not need to be controllable here and can be actuated, for example, by means of a fixed cam.

The closing time of the first inlet valve advantageously lies before the closing time of the second inlet valve below a third engine speed which lies between the first and second engine speeds. As a result, a good amount of swirl can be generated in the entire rotational speed range below the third engine speed. Here, the third engine speed expediently lies above the rotational speed range in which a high degree of swirl has a positive effect on the power and the emission of pollutants.

According to one preferred embodiment of the method according to the invention, the third engine speed is controlled as a function of a torque demand. In this way, the third engine speed may be lowered, for example when a high torque is demanded, that is to say when there is a large load, so that the closing time of the first inlet valve is already adjusted from early to late in a relatively low rotational speed range. As a result, particularly variable adaptation of the valve control system to specified power values is obtained. This may be advantageous in an operating mode of the internal combustion engine in which the load is large and a high degree of filling of the cylinder has priority over a pronounced degree of swirl with low exhaust gas emission values.

A particularly cost-effective way of carrying out the method according to the invention can be obtained if the below the third engine speed the first inlet valve is closed before the second inlet valve, with a constant time difference. With such a closing time control of the first inlet valve, the first inlet valve does not need to be controlled as a function of the engine speed when the engine speed is below the third engine speed.

If the closing time of the first inlet valve lies above the third engine speed after the closing time of the second inlet valve with a constant time interval, the inlet valve does not need to be controlled as a function of the rotational speed in this rotational speed range either. In particular when the closing time is constant above and below the third engine speed, a simple operating mechanism, for example with a first and a second cam component acting on a cam follower can be used. It is also conceivable to control the inlet valve with a control element which has two cam taps which can be decoupled from one another.

In one expedient refinement of the invention, the geometry of the cylinder is configured in such a way that, as a result of gas flowing in through only the inlet opening of the first valve, a first swirl is generated in the cylinder, and as a result of gas flowing in through only the inlet opening of the second valve a second swirl is generated in the cylinder, wherein the second swirl is considerably stronger than the first swirl. As a result, a strong swirl is generated at a low rotational speed at which only the second valve is opened at the end of the inlet period, whereas at a high rotational speed at which only the first inlet valve is open at the end of the inlet period only a small swirl, or essentially no swirl, is generated. A high degree of swirl can be obtained at a low rotational speed and a low degree of swirl can be obtained at a high rotational speed with better air charge rate. The geometry of the cylinder comprises the geometry of the inlet openings and, if appropriate, the valve geometry.

A particularly widely variable valve operating mechanism for the first inlet valve is obtained if the first inlet valve is operated by an electromagnetic valve operating system. In addition, the method is advantageously applied in a diesel internal combustion engine since in such an engine a high degree of swirl leads particularly effectively to an improvement in power and reduction in pollutants in the low rotational speed range.

The invention will become more readily apparent from the following description of an exemplary embodiment of the invention with reference to the accompanying drawings.

DESCRIPTION OF A PARTICULAR EMBODIMENT

Figure 1:
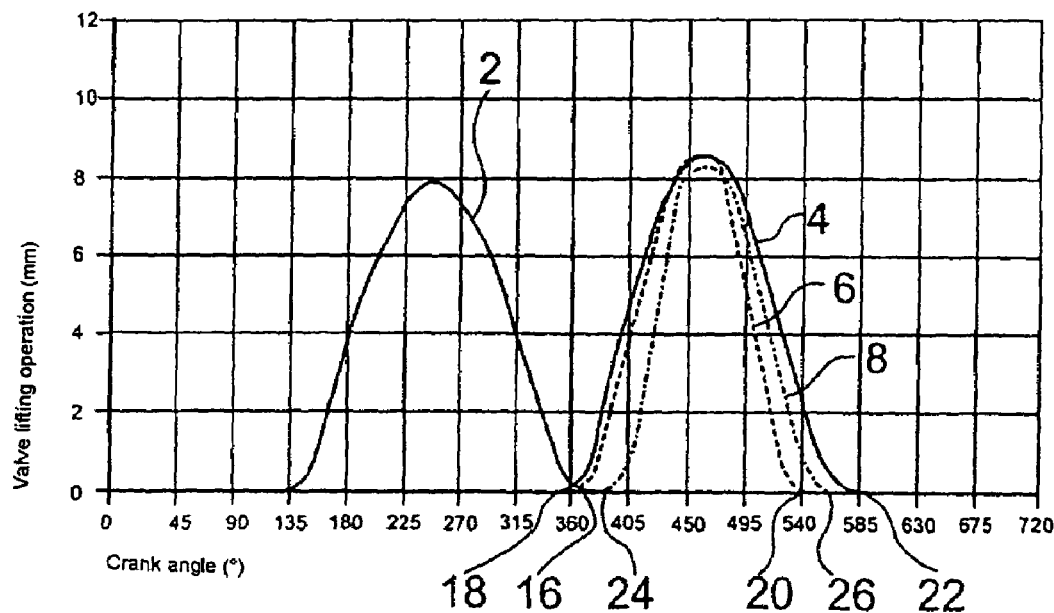
FIG. 1 shows possible valve lift curves of inlet valves and of an outlet valve at a first engine speed.
Figure 2:
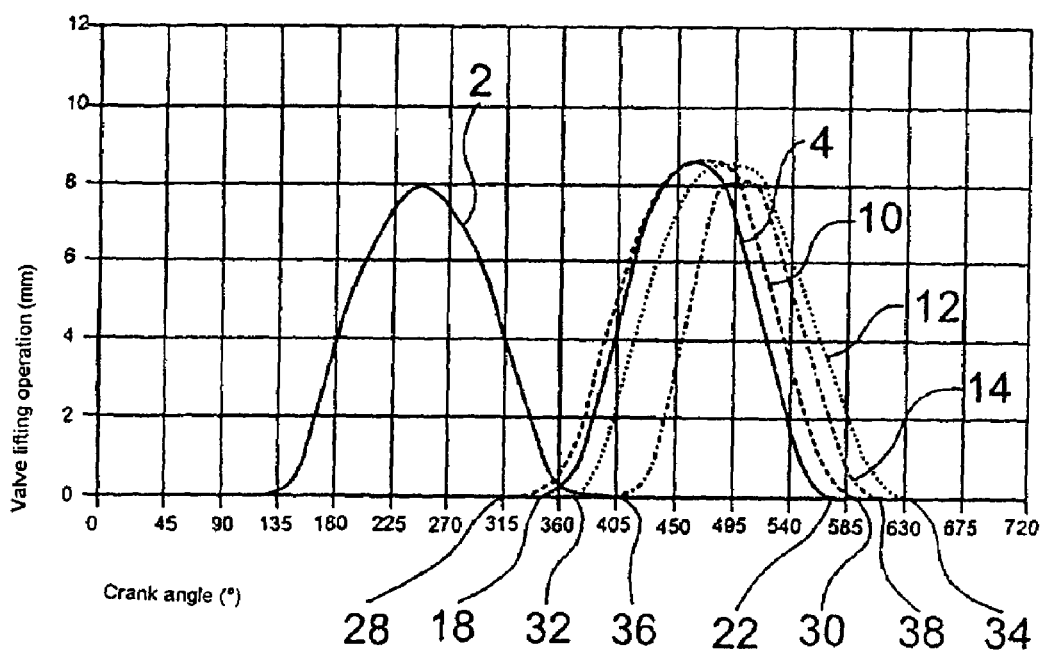
FIG. 2 shows possible valve lift operations of the inlet valves and of the outlet valve at a second engine speed.

FIG. 1 and FIG. 2 each show the valve lift operation of two inlet valves and one outlet valve of a cylinder in a diagram in which the valve lift operation is plotted over the crank angle. In this context it is irrelevant for the explanation of the exemplary embodiments whether the cylinder has additional valves. The valve lift curve 2 for the outlet valve is illustrated left of the top dead center position, marked by 360°, and possible valve lift curves 4, 6, 8, 10, 12, 14 of the inlet valves are illustrated to the right of the top dead center location.

FIG. 1 shows possible valve lift control procedures for the inlet valves at a first engine speed, which typically lies in the lower rotational speed range of the internal combustion engine. The first of the two inlet valves is equipped with a variable valve control system, while the second inlet valve is actuated in rigid fashion, for example by a simple cam. The second inlet valve has a valve lift actuation 4 which is the same over the entire rotational speed range of the internal combustion engine. The first inlet valve has the unchanged valve lift operation 6 or 8, respectively, in the entire rotational speed range which lies below a third engine speed.

FIG. 1 illustrates two possible valve lift operations 6, 8 of the first inlet valve which can be controlled in a variable fashion. In a first control variant of the first inlet valve, the valve lift actuation 6 occurs in such a way that the opening time 16 of the first inlet valve which can be actuated in a variable fashion is approximately the same as the opening time 18 of the second inlet valve which is actuated in a rigid fashion. In contrast, the closing time 20 of the first inlet valve lies approximately 40° before the closing time 22 of the second inlet valve. As a result of the fact that only the second inlet valve is still open at the end of the inlet time range, a strong swirl is produced in the interior of the cylinder by the combustion air flowing in through the second inlet valve. As a result, the fuel in the cylinder is mixed in a sufficiently homogenous fashion during a subsequent fuel injection process.

In one alternative control variant for the first inlet valve, the valve lift operation 8 is moved somewhat to a later point in comparison with the valve lift operation 6. As a result of this, the opening time 24 of the first inlet valve is also moved to a later point in comparison with the opening time 18 of the second inlet valve. The closing time 26 of the first inlet valve however, is still by approximately 20° earlier than the closing time 22 of the second inlet valve. As a result of the open offset of the valve lift operation 8 in comparison with the valve lift operation 4, the swirl is generated mainly at the start of the inlet period at low rotational engine speeds. The late opening of the first inlet valve, which opens without the valve overlap with respect to the outlet valve, generates a partial vacuum in the cylinder which entails high gas speeds when the first inlet valve opens. Since the ramp is made as steep as possible, the charge change losses are minimized and a large adjustment range is made possible. The valve stroke of the two inlet valves is approximately the same, specifically somewhat more than 8 mm. The stroke may fluctuate somewhat in the actuation variants of the first inlet valve, but always lies essentially in the region of the stroke of the second inlet valve which is rigidly actuated.

FIG. 2 shows possible valve lift actuations 10, 12, 14 of the first inlet valve at a second engine speed which usually lies in the upper rotational speed range of the internal combustion engine. In a first actuation possibility of the first inlet valve, the valve lift operation 10 for the first inlet valve lies around the valve lift operation 4 of the second inlet valve. An opening time 28 which is several degrees earlier than the opening time 18 of the second inlet valve which is actuated in a rigid fashion is associated with the first inlet valve. In contrast, the closing time 30 of the first inlet valve is moved back to a later time by approximately 150 in comparison with the closing time 22 of the second inlet valve. Due to the geometry of the cylinder, the swirl is thus reduced selectively at high rotational speeds by means of the movement of the charge, permitting the charge exchange work to be reduced. The long opening time of the first inlet valve permits a high degree of filling of the cylinder, as a result of which a high torque can be achieved.

In one alternative control variant, the valve lift operation 12, which is largely identical in form to the valve lift operation 10, is moved in its entirety to a later point. The opening time 32 of the first inlet valve thus lies after the opening time 18 of the second inlet valve. The closing time 34 of the first inlet valve also is after the closing time 22 of the second inlet valve. A valve lift operation 14 is shown as a further possible alternative control variant of the first inlet valve, said valve lift operation 14 being made narrower in contrast with the valve lifting operation 12. Depending on the torque request, the chronological width of the valve lift operation 14 can be adapted, but the closing time 38 basically lies after the closing time 22 of the first inlet valve. The opening time 36 of the first inlet valve can also be moved in a variable fashion and in the example shown in FIG. 2 it lies far after the opening time 18 of the second inlet valve.

The valve lift operations 10, 12 and 14 of the first inlet valve are constant over the entire rotational speed range above the third engine speed. The first inlet valve is actuated in such a way that it has the valve lift operation 6 or 8 below the third engine speed. If the third engine speed is exceeded, the valve control system of the first valve switches over so that the first inlet valve is operated with a valve lift operation 10, 12 or 14 which is adjusted toward late. The closing time 22 of the second inlet valve is kept constant over the entire rotational speed range.

Figure 3:
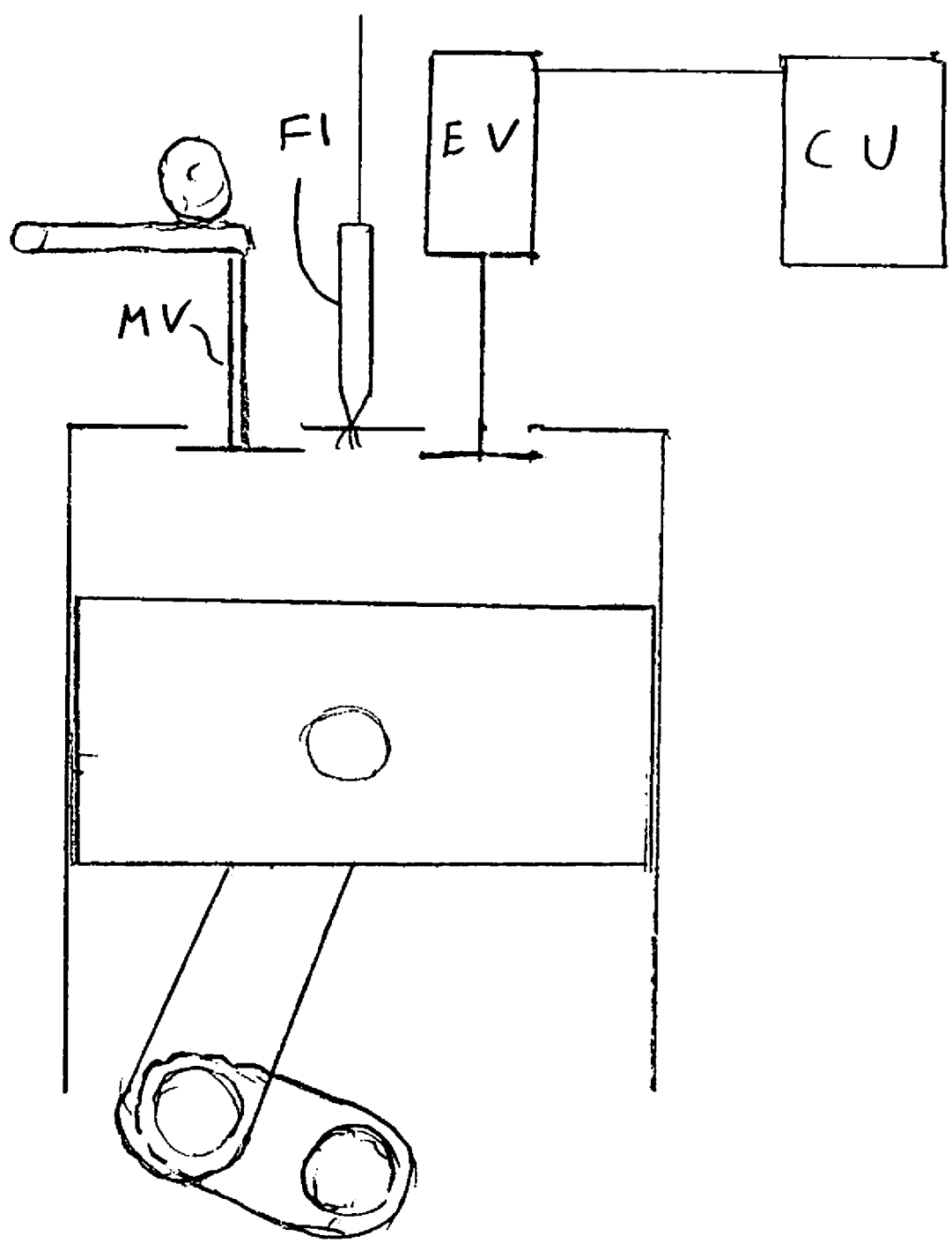
FIG. 3 shows schematically a cylinder with two inlet valves.

As already mentioned earlier a particularly widely variable inlet valve operating mechanism can be obtained when at least one of the inlet valves is an electromagnetic valve EV as shown schematically in FIG. 3. The other valve may be a conventional mechanically operated valve MV. The electromagnetic valve can be actuated in a very wide range by an electronic valve control unit CU. In FIG. 3, the fuel injector FI is shown in a position centrally between the two inlet valves MV and EV.

What is claimed is:

1. A method of controlling an inlet valve of an internal combustion engine having at least one cylinder with at least a first inlet valve and a second inlet valve, said first inlet valve having an adjustable closing time (20, 26, 30, 38, 34) said method comprising the steps of adjusting the closing time (20, 26) of the first inlet valve to be before the closing time (22) of the second inlet valve at a first engine speed and the closing time (30, 38, 34) of the first inlet valve to be after the closure time (22) of the second inlet valve at a second engine speed, which is higher than the first engine speed, and, during a third engine speed which lies between the first and second engine speeds, controlling the first inlet valve as a function of a torque demand.

2. The method as claimed in claim 1, wherein the closing time (22) of the second inlet valve is kept constant over the entire rotational speed range of the engine.

3. The method as claimed in claim 1, wherein, below the third engine speed, the closing time (20, 26) of the first inlet valve lies with a constant time interval before the closing time (22) of the second inlet valve.

4. The method as claimed in claim 1, wherein, above the third engine speed, the closing time (30, 34, 38) of the first inlet valve lies with a constant time interval after the closing time (22) of the second inlet valve.

5. The method as claimed in claim 1, wherein the geometry of the cylinder is configured in such a way that, as a result of gas flowing into the cylinder through only the inlet opening of the first valve, a first swirl is generated in the cylinder and, as a result of gas flowing into the cylinder through only the inlet opening of the second valve, a second swirl is generated in the cylinder which is stronger than the first swirl.

6. The method as claimed in claim 1, wherein the first inlet valve is actuated by an electromagnetic valve control system.

7. The method as claimed in claim 1, wherein the method is performed in connection with a diesel internal combustion engine.

* * * * *